United States Patent
Matsuoka et al.

(10) Patent No.: US 8,191,961 B2
(45) Date of Patent: Jun. 5, 2012

(54) REAR VEHICLE-BODY STRUCTURE OF VEHICLE

(75) Inventors: Hidenori Matsuoka, Hiroshima (JP); Hirotaka Natsume, Hiroshima (JP)

(73) Assignee: Mazda Motor Corporation (JP)

( * ) Notice: Subject to any disclaimer, the term of this patent is extended or adjusted under 35 U.S.C. 154(b) by 21 days.

(21) Appl. No.: 12/950,299

(22) Filed: Nov. 19, 2010

(65) Prior Publication Data
US 2011/0156447 A1 Jun. 30, 2011

(30) Foreign Application Priority Data
Dec. 25, 2009 (JP) .................................. 2009-294370

(51) Int. Cl.
*B62D 25/08* (2006.01)
(52) U.S. Cl. .............................. 296/193.08; 296/203.04
(58) Field of Classification Search ............. 296/203.01, 296/203.04, 193.08
See application file for complete search history.

(56) References Cited

U.S. PATENT DOCUMENTS
2005/0073174 A1* 4/2005 Yamaguchi et al. ..... 296/203.04
2009/0278384 A1* 11/2009 Yamada et al. .......... 296/187.11
2010/0072786 A1* 3/2010 Koyama et al. .......... 296/203.04

FOREIGN PATENT DOCUMENTS
JP 2006-069265 A 3/2006
JP 2009-001197 A 1/2009
* cited by examiner

*Primary Examiner* — Dennis Pedder
(74) *Attorney, Agent, or Firm* — Studebaker & Brackett PC; Donald R. Studebaker

(57) ABSTRACT

In a rear vehicle-body structure of a vehicle in which a damper support portion supporting an upper end portion of a suspension damper is provided at a rear wheel house, on a vehicle-inside wall face of the rear wheel house are provided a first brace member which interconnects a front portion of the damper support portion and a rear side frame and a second brace member which interconnects a rear portion of the damper support portion and the rear side frame. Accordingly, the rigidity of the damper support portion provided at the rear wheel house can be improved easily and effectively, and this structure can have superiority in its applicability.

12 Claims, 11 Drawing Sheets

REAR VEHICLE-BODY STRUCTURE OF VEHICLE

BACKGROUND OF THE INVENTION

The present invention relates to a rear vehicle-body structure of a vehicle in which a damper support portion supporting an upper end of a suspension damper is provided at a wheel house.

Conventionally, a rear vehicle-body structure of a vehicle, in which a pair of rear side frames is provided at right and left sides of a vehicle-body rear portion and a pair of wheel houses is provided at the pair of rear side frames, is known as disclosed in Japanese Patent Laid-Open Publication No. 2009-1197. In this structure, a ring-shaped frame portion is constituted by an upper cross member which interconnects reinforcement portions formed at right and left damper attachment portions, right and left leg members which extend from the upper cross member to the right and left rear side frames, and a lower cross member which connects the right and left leg members and interconnects the right and left rear side frames. Thereby, the rigidity of the right and left reinforcement portions can be secured properly, and loads acting on the damper attachment portions of the right and left wheel houses can be supported properly.

Further, in a vehicle in which an opening of a back door is formed at a vehicle-body rear wall, as shown in Japanese Patent Laid-Open Publication No. 2006-69265, there is provided a pair of connecting gussets which extends in a vehicle longitudinal direction and interconnects a peripheral portion of the above-described opening of the vehicle-body rear wall and an upper portion of a rear wheel house portion, and further there is provided a reinforcing member which extends in a vehicle width direction along the rear wheel house portion and an upper face of a floor portion, and connects to upper portions of the right and left rear wheel house portions at its both ends. Herein, the connecting gussets and the reinforcing member are connected at the upper portions of the rear wheel house portions. Thereby, the torsional rigidity of the vehicle-body rear portion can be improved.

According to the above-described structure disclosed in the former patent publication, since the rigidity of the rear vehicle body is secured by using the upper cross member supporting an upper end portion of a rear parcel (rear package tray), there are problems in that this structure may be only applicable to vehicles, such as a sedan type of vehicle having the rear parcel, so that its applicability would be improperly limited, and the utility of a rear baggage room would be deteriorated by the upper cross member arranged at an upper position of the rear baggage room.

Meanwhile, according to the above-described structure disclosed in the latter patent publication, there is a problem in that this structure may be only applicable to a so-called hatchback (rear lift gate) type of vehicle having a hatch back (rear lift gate), so that it would be difficult that the above-described structure can be properly applied to other types of vehicles, such as the sedan type of vehicle. Further, since the connecting gussets having a specified width are arranged to extend longitudinally along side wall portions of the vehicle-body rear portion, smooth loading of baggage into the rear baggage room would be hindered by the connecting gussets, so that the utility of the rear baggage room would deteriorate as well.

SUMMARY OF THE INVENTION

The present invention has been devised in view of the above-described problems, and an object of the present invention is to provide a rear vehicle-body structure of a vehicle which can easily and effectively improve the rigidity of the damper support portion provided at the wheel house.

According to the present invention, there is provided a rear vehicle-body structure of a vehicle, comprising a wheel house projecting toward a vehicle inside, a suspension damper stored on a vehicle outside of the wheel house, a damper support portion provided at an upper portion of the wheel house and supporting an upper end portion of the suspension damper, a side frame extending in a vehicle longitudinal direction at a side portion of a vehicle floor, a cross member extending in a vehicle width direction along the vehicle floor and connecting to the side frame, a first brace member provided on a vehicle-inside wall face of the wheel house and interconnecting a front portion, in the vehicle longitudinal direction, of the damper support portion and the side frame, and a second brace member provided on the vehicle-inside wall face of the wheel house and interconnecting a rear portion, in the vehicle longitudinal direction, of the damper support portion and the side frame.

According to the present invention, the first and second brace members reinforce the damper support portion effectively so that the damper support portion's falling down inwardly or the like can be effectively prevented, so that the damper support portion can be effectively reinforced. Further, since the first and second brace members are arranged to extend substantially vertically along the vehicle-inside wall face of the wheel house, it can be effectively prevented by these brace members that any vibration of the wheel house and thereby noises occur, without improperly deteriorating the utility of the rear baggage room. Moreover, the structure of the present invention is not limited to the sedan type of vehicle or the hatch-back type of vehicle in its application, so that the present invention is applicable widely and therefore superior in its applicability.

According to an embodiment of the present invention, the side frame comprises a pair of side frames provided at both side portions of the vehicle floor, and the cross member includes a cross member which interconnects the pair of side frames at a connection position of the side frame connecting to the first brace member. Thereby, the above-described cross member can be effectively used as a support member against a load inputted to the damper supporter portion from the suspension damper, so that the damper support portion can be further effectively reinforced with a simple structure, and thereby the damper support portion's falling down inwardly can be securely prevented.

According to another embodiment of the present invention, the side frame comprises a pair of side frames provided at both side portions of the vehicle floor, and the cross member includes a cross member which interconnects the pair of side frames at a connection position of the side frame connecting to the second brace member. Thereby, since the pair of side frames at the connection position of the side frame connecting to the second brace member are interconnected via the cross member, the load inputted to the damper support portion from the suspension damper can be transmitted from the second brace member to the cross member, the rear baggage room and so on, and thereby supported effectively. Accordingly, the damper support portion's falling down inwardly and the like can be further effectively prevented.

According to another embodiment of the present invention, the side frame comprises a pair of side frames provided at both side portions of the vehicle floor, and the cross member includes a first cross member which interconnects the pair of side frames at a connection position of the side frame connecting to the first brace member and a second cross member which interconnects the pair of side frames at a connection position of the side frame connecting to the second brace member. Thereby, the above-described prevention of the damper support portion's falling down inwardly can be further effectively achieved by the first and second cross members.

According to another embodiment of the present invention, the second cross member is arranged so that at least part of the second cross member overlaps, in the vehicle longitudinal direction, with the second brace member in a vehicle side view. Thereby, the load inputted to the damper support portion from the suspension damper can be securely transmitted from the second brace member to the second cross member and the floor panel.

According to another embodiment of the present invention, the first and second brace members comprise a member having a U-shaped cross section with an open end, respectively, and the first and second brace members are attached to the vehicle-inside wall face of the wheel house so that a closed cross section extending substantially vertically is formed between the first and second brace members and the wheel house, respectively. Thereby, the modulus of section at the portions where the first and second brace members are attached can be properly increased without setting the plate thickness of these brace members great. Accordingly, the rigidity and strength of the wheel house can effectively improve with restraining increase of the vehicle-body weight, so that the damper support portion's falling down inwardly and the like can be effectively prevented.

According to another embodiment of the present invention, a pair of projection portions which projects toward the vehicle inside is formed at the damper support portion of the wheel house at specified positions which are located in front and back of the suspension damper, respectively, and the first and second brace members connect to the pair of projection portions at upper portions thereof, respectively. Thereby, both of a front side portion and a rear side portion of the damper support portion can be effectively reinforced, without increasing the vehicle-body weight. Further, the load inputted to the damper support portion from the suspension damper can be efficiently transmitted to the vehicle-body side wall portion and the floor panel via the first and second brace members and thereby supported properly.

According to another embodiment of the present invention, the damper support portion of the wheel house includes a reinforcing member which reinforces the damper support portion, and the first and second brace members connect to the reinforcing member at upper portions thereof, respectively. Thereby, the suspension damper can be stably supported at the damper support portion, and the load inputted to the damper support portion and the reinforcing member from the suspension damper can be effectively transmitted to the first and second brace members and thereby supported properly.

According to another embodiment of the present invention, an outer-face-side reinforcing member is provided on an outer-face side, in the vehicle width direction, of the damper support portion of the wheel house so as to extend upwardly from a specified position corresponding to the upper portion of the wheel house. Thereby, the load inputted to the damper support portion from the suspension damper can be transmitted from the outer-face-side reinforcing member to a roof rail provided at an upper portion of the vehicle body or the like, and thereby supported further effectively.

Other features, aspects, and advantages of the present invention will become apparent from the following description which refers to the accompanying drawings.

DETAILED DESCRIPTION OF THE INVENTION

Figure 1:
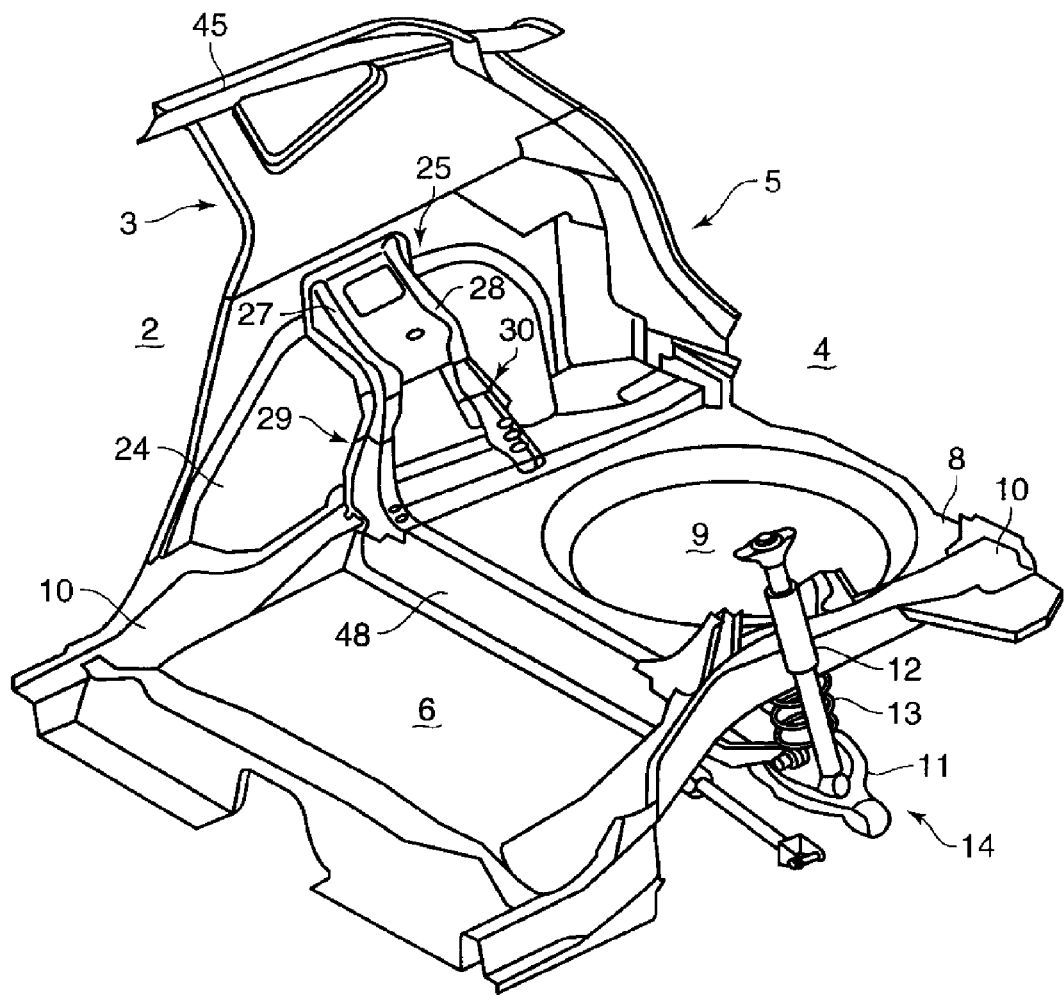
FIG. 1 is a perspective view showing an embodiment of a rear vehicle-body structure of a vehicle according to the present invention.
Figure 2:
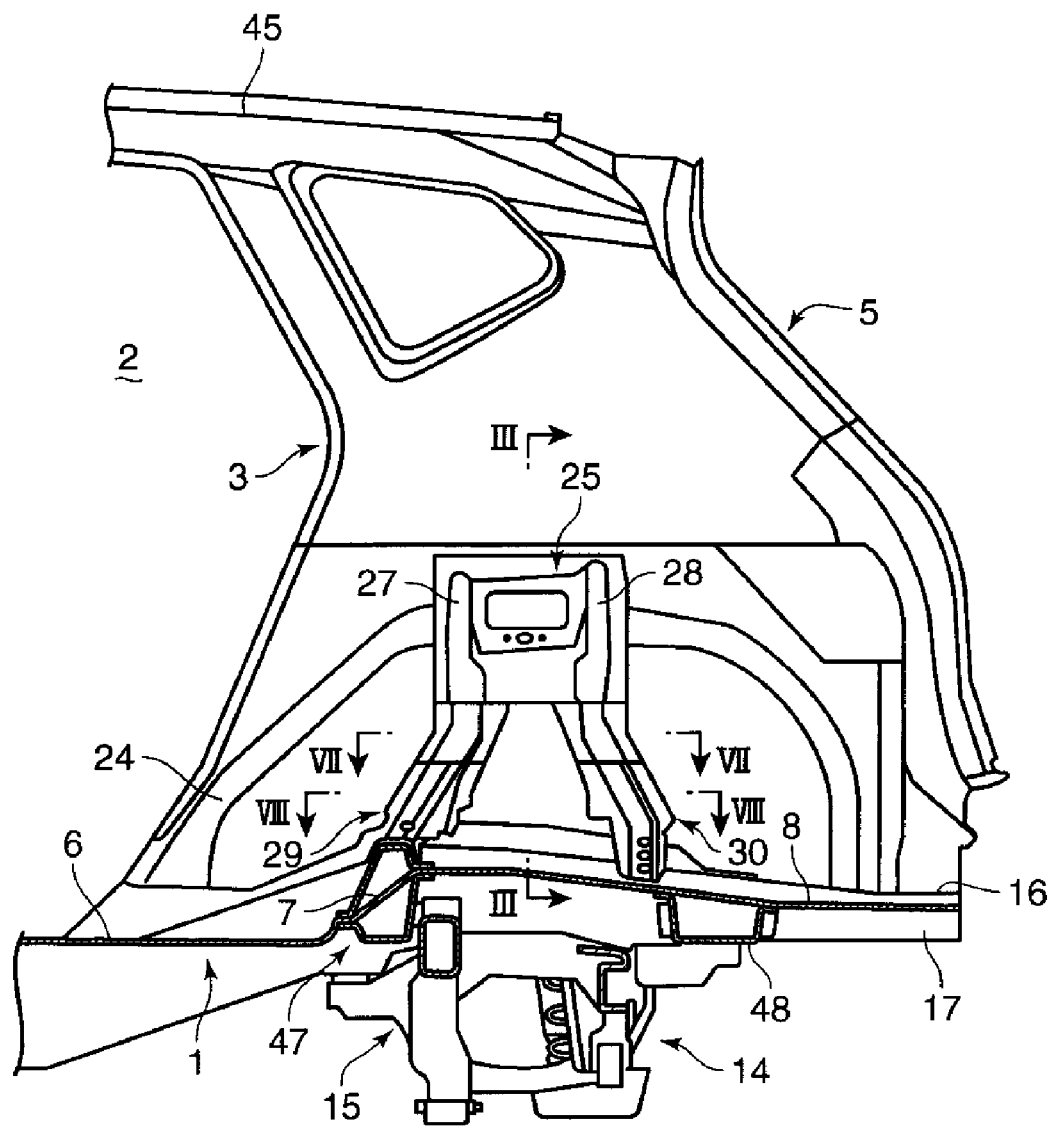
FIG. 2 is a side sectional view showing a specific structure of the rear vehicle-body structure.

Hereinafter, preferred embodiments of the present invention will be described referring to the accompanying drawings.

FIGS. 1 through 4 show an embodiment of a rear vehicle-body structure of a vehicle according to the present invention. The rear vehicle-body structure comprises a floor panel 1 which constitutes a bottom face portion of a vehicle body, a vehicle-body side wall portion 3 which has an ingress-egress opening 2 which is closable by a side door, not illustrated, and a vehicle-body rear wall portion 5 which has a rear opening 3 which is closable by a back door, not illustrated.

The floor panel 1 comprises a vehicle-inside floor portion 6 on which a seat for passenger (not illustrated) is arranged, a kick-up portion 7 which extends obliquely upwardly from a rear end portion of the vehicle-inside floor portion 6, and a rear floor portion 8 which extends rearwardly from an upper end portion of the kick-up portion 7. A tire pan 9 as a storage portion of a spare tire is formed at the rear floor portion 8, and a pair of rear side frames 10 is arranged to extend on both sides of the tire pan 9. Below the rear floor portion 8 are arranged a pair of rear suspensions 14 which comprises a lower arm 11, a suspension damper 12, a coil spring 13, and so on, respectively, and a sub frame 15 which supports the rear suspension 14.

Figure 3:
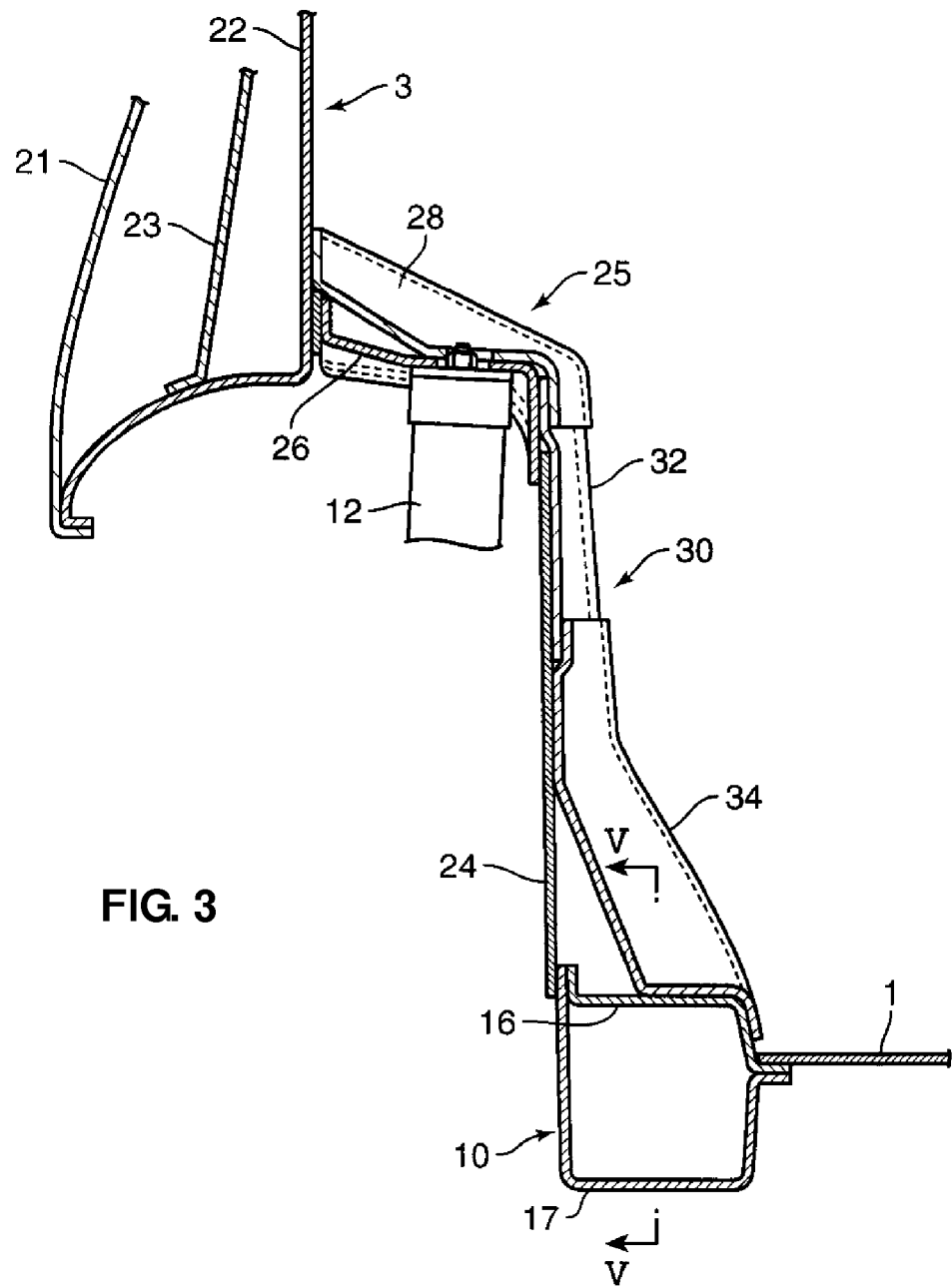
FIG. 3 is a sectional view taken along line III-III of FIG. 2.
Figure 5:
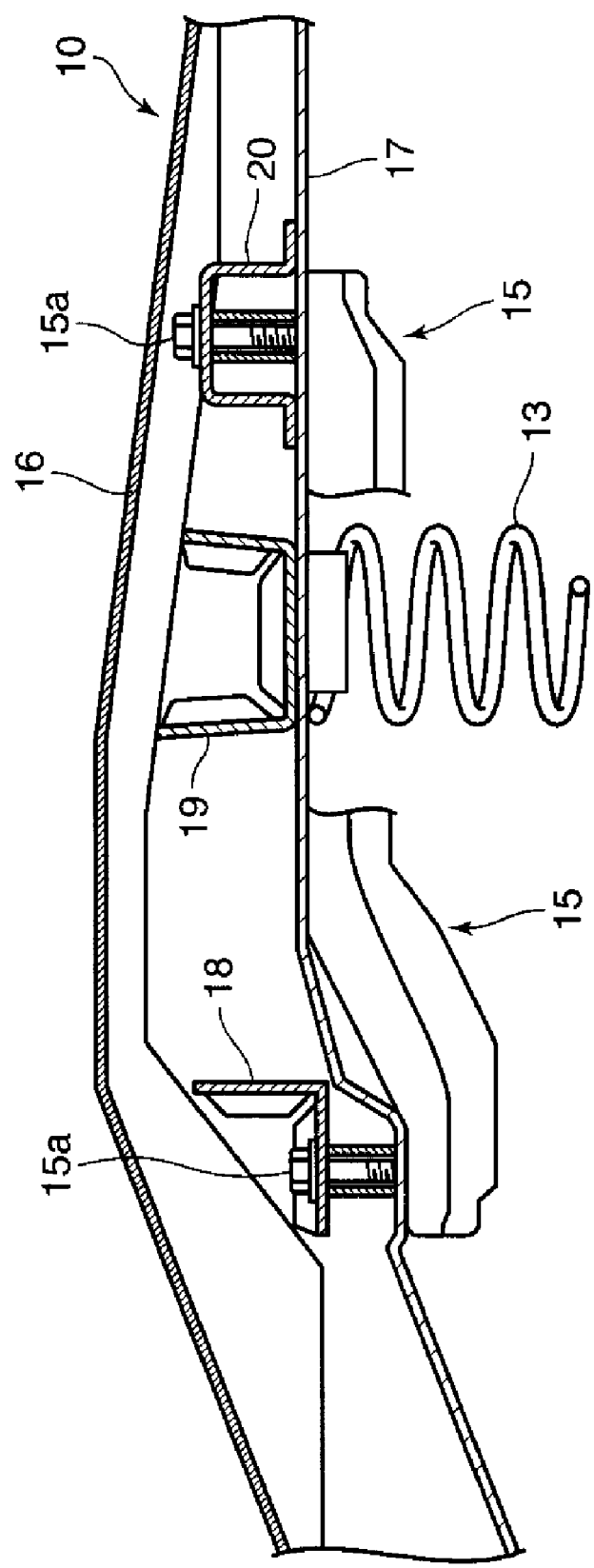
FIG. 5 is a sectional view taken along line V-V of FIG. 2.

The rear side frame 10 comprises, as shown in FIGS. 3 and 5, an upper member 16 which forms a step portion projecting upwardly from the floor panel 1 and a lower member 17 which has a U-shaped cross section concaved downwardly from the floor panel 1. These upper and lower members 16, 17 form a closed cross section which extends in the vehicle longitudinal direction. The floor panel 1 is fixed to respective inward side portions of the pair of rear side frames 10.

Inside the rear side frame 10 is arranged a first reinforcing bracket 18 which is made of an L-shaped member to reinforce a front end attachment portion of the sub frame 15 at a specified position corresponding to the kick-up portion 7. Further, in back of the first reinforcing bracket 18 are provided a second reinforcing bracket 19 which is made of a U-shaped member to reinforce an arrangement portion of the coil spring 13 and a third reinforcing bracket 20 which is made of a reverse-U-shaped member to reinforce a rear end attachment portion of the sub frame 15. These brackets 18, 19, 20 are disposed with specified distances, respectively.

Figure 4:
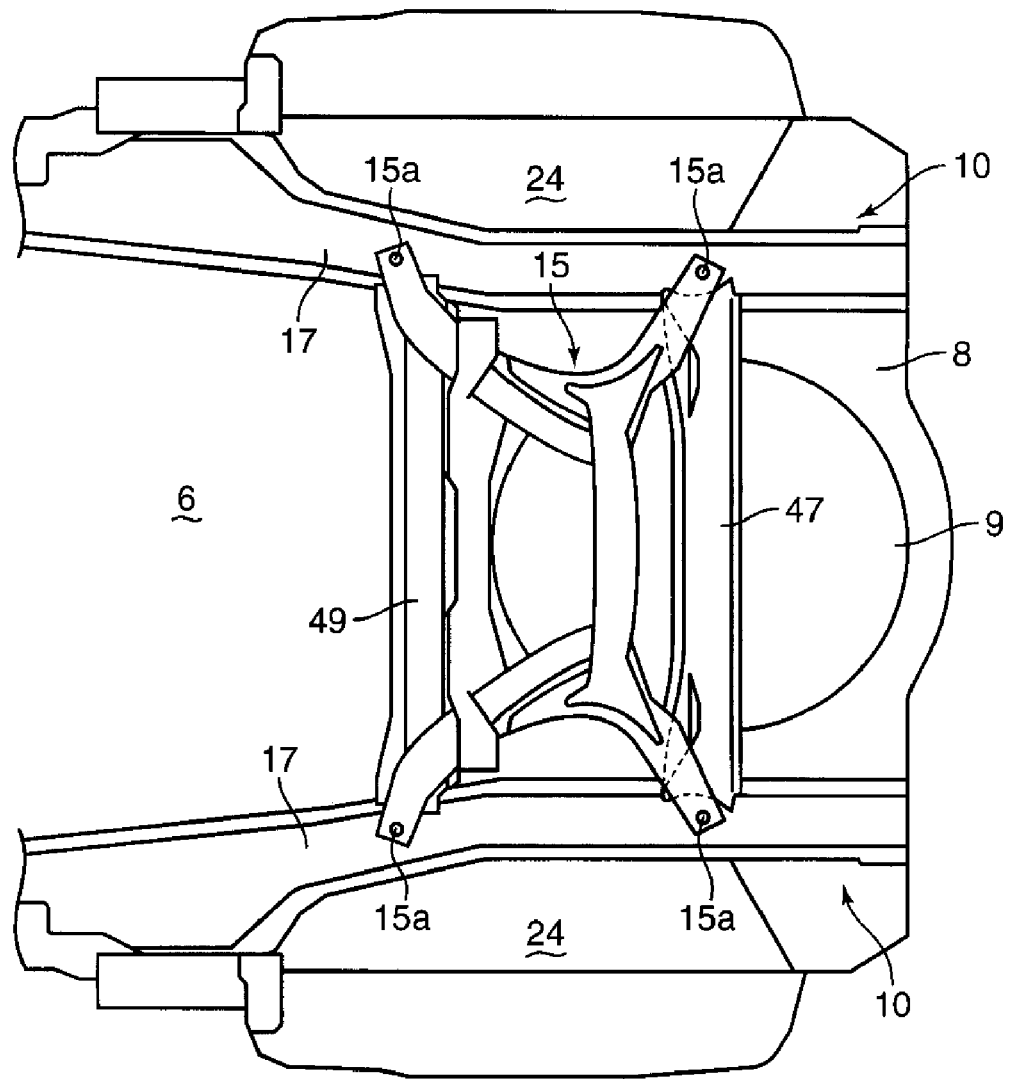
FIG. 4 is a bottom view showing the specific structure of the rear vehicle-body structure.

As shown in FIGS. 4 and 5, an attaching bolt 15a which attaches the sub frame 15 to the rear side frame 10 is provided, and the sub frame 15 is attached to a lower face of the lower member 17 of the rear side frame 10 at respective outward positions corresponding to the lower member 49 of a first cross member 46 and a second cross member 47.

The vehicle-body side wall portion 3 comprises, as shown in FIG. 3, an outer panel 21 and an inner panel 22, and an outer-face-side reinforcing member 23 which comprises a rear pillar reinforcement, a quarter panel reinforcement or the like is arranged between the outer and inner panels 21, 22. A rear wheel house 24 which projects toward the vehicle inside is formed at a lower portion of the inner panel 22. At a central portion of an upper face of the rear wheel house 24 are provided a damper support portion 25 which supports an upper end portion of the suspension damper 12 and a reinforcing member 26 which reinforces the damper support portion 25 from its back face.

A pair of projection portions 27, 28 which projects toward the vehicle inside (upwardly and inwardly) is formed at the damper support portion 25 at specified positions which are located in front and back of the suspension damper 12, respectively. Further, a first brace member 29 is provided on a vehicle-inside wall face of the rear wheel house 24 to extend downwardly from the above-described projection portion 27, meanwhile a second brace member 30 is provided on the vehicle-inside wall face of the rear wheel house 24 to extend downwardly from the above-described projection portion 28 (see FIGS. 1 and 2).

Figure 6:
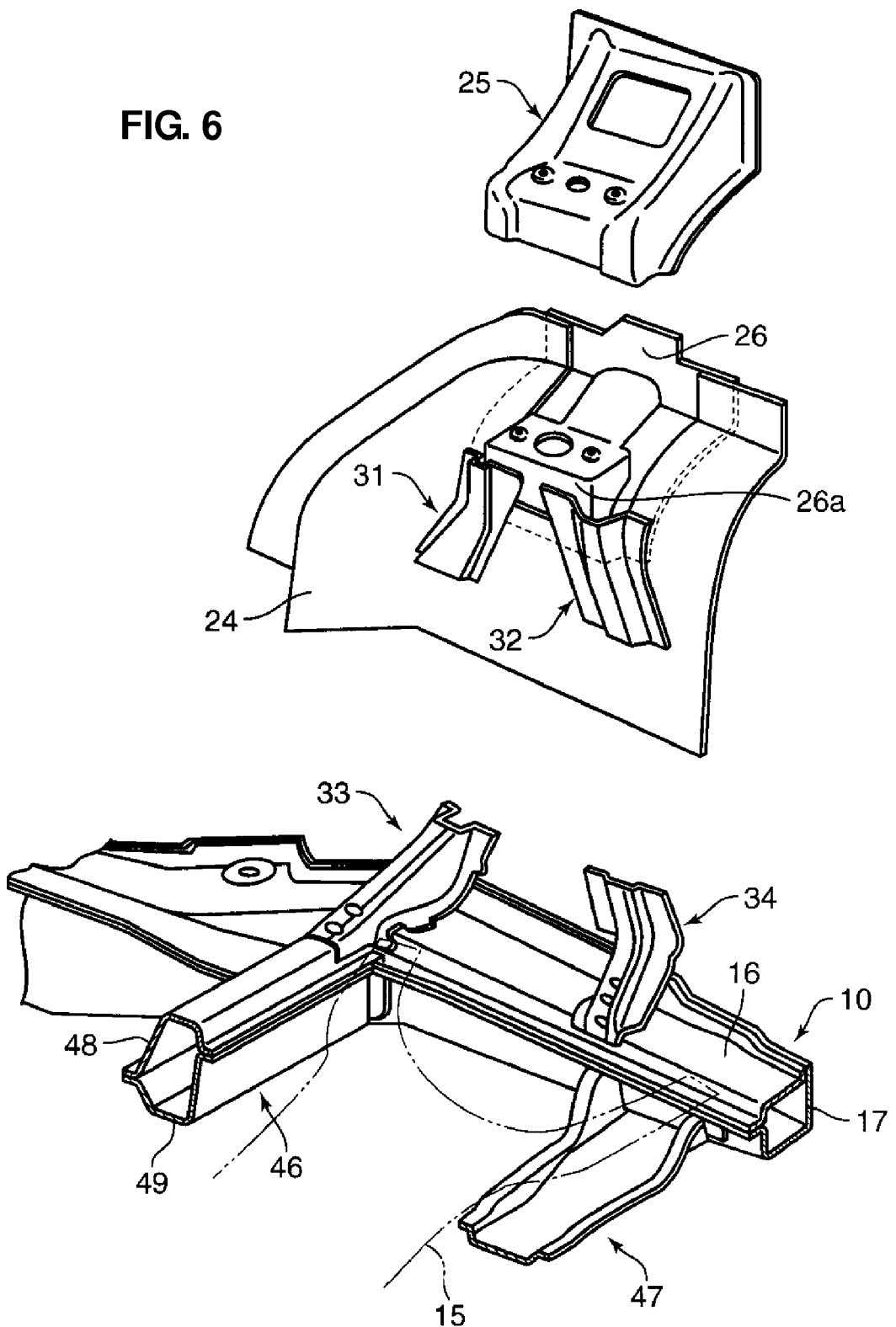
FIG. 6 is an exploded perspective view showing the specific structure of the rear vehicle-body structure.

As shown in FIG. 6, the first and second brace members 29, 30 are respectively comprised of upper members 31, 32 which extend downwardly from an inward side portion of the damper support portion 25 and lower members 33, 34 which extend upwardly from an upper face portion of the rear side frame 10. Respective upper end portions of the lower members 33, 34 are connected to respective lower end portions of the upper members 31, 32. Thus, the first brace member 29 extends so as to interconnect the front portion, in the vehicle longitudinal direction, of the damper support portion 25 and the rear side frame 10, and the second brace member 30 extends so as to interconnect the rear portion, in the vehicle longitudinal direction, of the damper support portion 25 and the rear side frame 10. Herein, the first brace member 29 slants forwardly, while the second brace member 30 slants rearwardly, in a side view, as illustrated (see FIG. 2).

Figure 7:
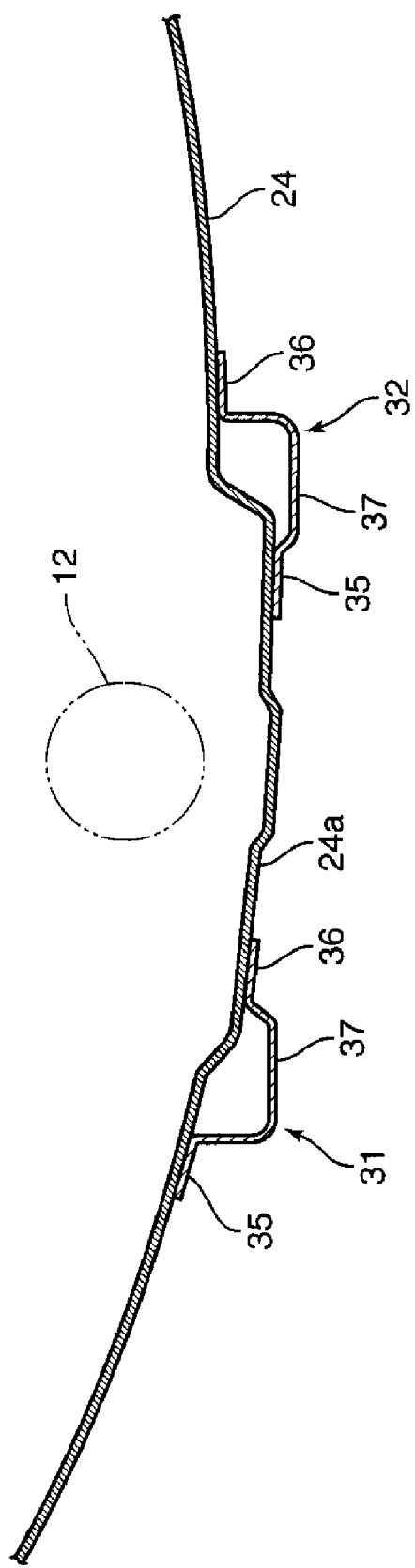
FIG. 7 is a sectional view taken along line VII-VII of FIG. 2.

As shown in FIG. 7, the upper member 31, 32 of the first and second brace members 29, 30 are made of steel plates, respectively, which are formed through a bending process or the like to have U-shaped cross sections which have a pair of attaching flanges 35, 36 and a body portion 37 with an open end outwardly. Herein, the upper end portions of the upper members 31, 32 are placed on the vehicle-inside wall face of the above-described reinforcing member 26, and the damper support member 25 is further placed on the upper end portions of the upper members 31, 32. In this state, these members are joined together by spot welding or the like (see FIG. 3). Further, the upper member 31, 32 are fixed to the vehicle-inside wall face of the rear wheel house 24, and the above-described projection portions 27, 28 and projection portions of the above-described body portions 37 of the upper members 31, 32 are connected, respectively. Thus, reinforcing portions are formed to extend substantially vertically.

Moreover, a projection portion 26a of the reinforcing member 26 which projects inwardly (see FIG. 6) and a projection portion 24a of the rear wheel house 24 which projects inwardly (see FIG. 7) are arranged to connect to each other in the vehicle vertical direction. The upper members 31, 32 are provided so as to cross over corner portions of the projection portions 26a, 24a.

Figure 8:
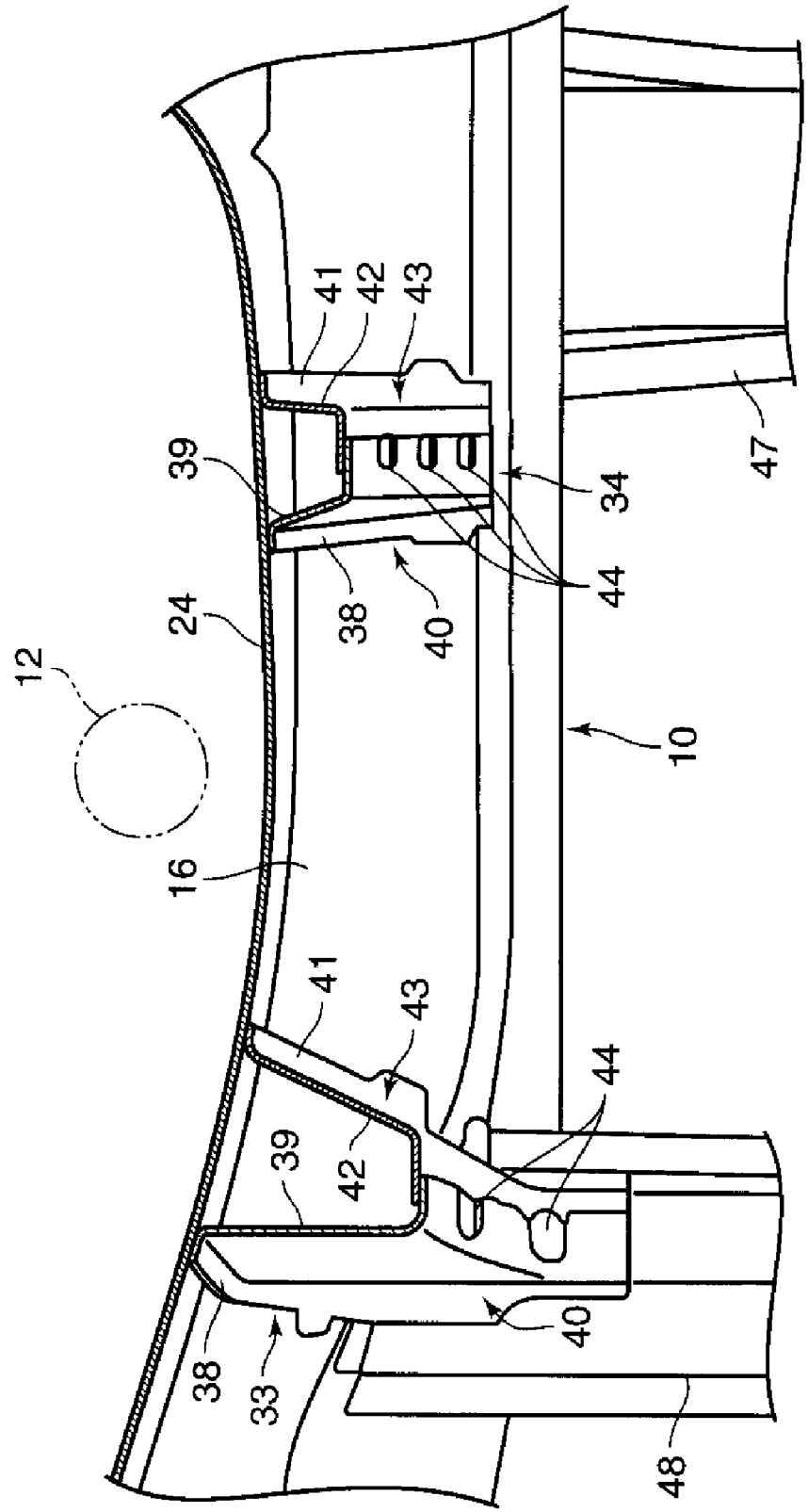
FIG. 8 is a sectional view taken along line VIII-VIII of FIG. 2.
Figure 9:
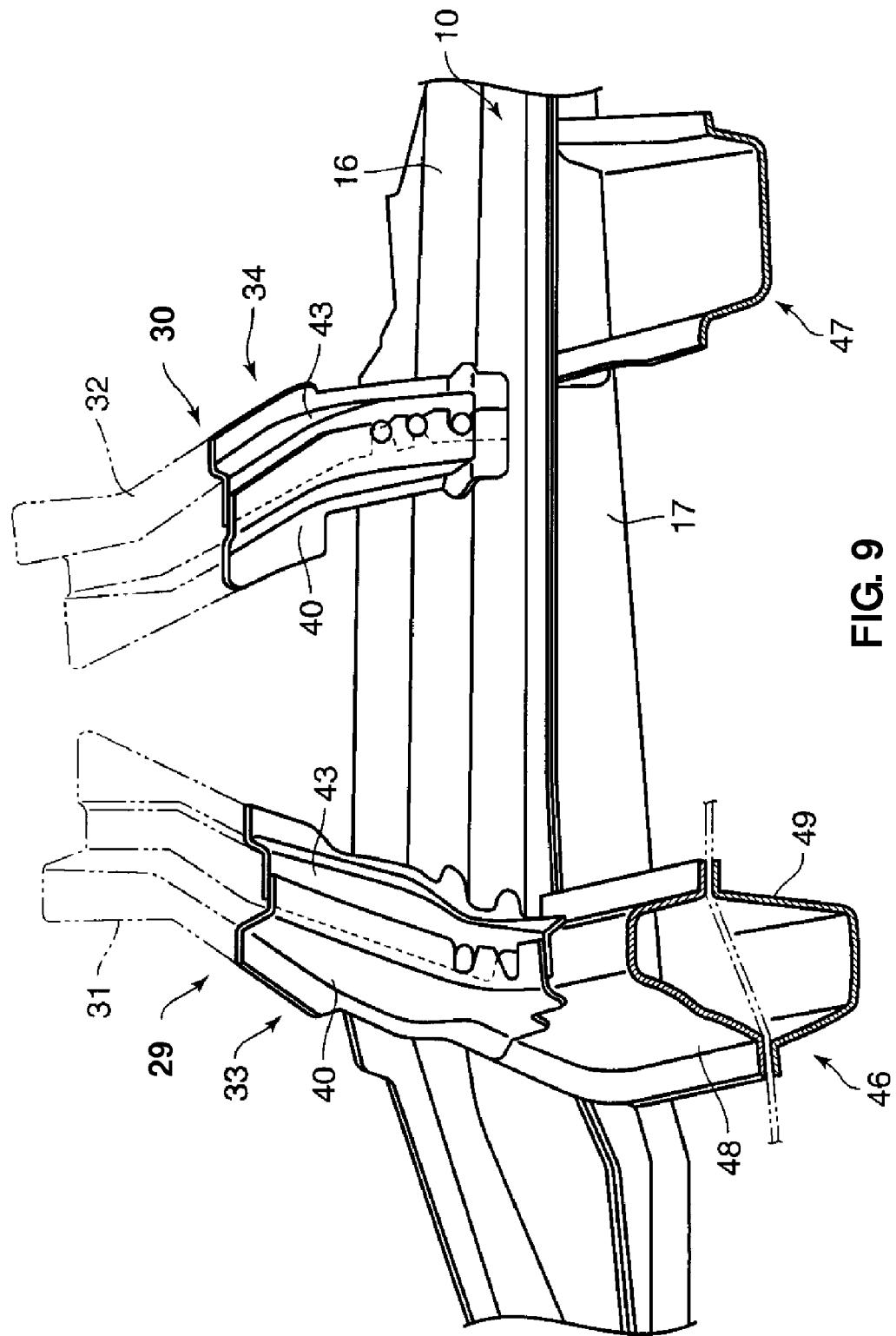
FIG. 9 is a perspective view showing lower members which constitute brace members.

Further, as shown in FIGS. 8 and 9, the lower member 33, 34 of the first and second brace members 29, 30 are made of steel plates, respectively, which are formed through a bending process or the like to have a front member 40 which includes a front flange 38 and a body portion 39 having a L-shaped cross section and a rear member 43 which includes a rear flange 41 fixed to the upper face of the rear side frame 10 or the like and a body portion 42 having a L-shaped cross section. The front member 40 and the rear member 43 are connected to each other so that the lower member 33, 34 respectively having a U-shaped cross section with an open end outwardly can be formed.

Plural openings 44 are formed at the lower members 33, 34 to facilitate the bending process of these lower members 33, 34. As shown in FIGS. 6 and 8, the lower member 33 arranged forwardly is formed so that the width of its body portions 39, 42 increases downwardly in an elevation view. That is, the width of the lower end portion of the lower member 33 is greater than that of the rear side frame 10. An inward end portion of the lower member 33 is fixed to the upper member 48 of the first cross member 46. Meanwhile, the lower member 34 arranged rearwardly is formed so that the width of its lower end portion is substantially equal to that of the rear side frame 10, and the lower end portion of the lower member 34 is fixed to the upper face of the rear side frame 10.

The lower end portions of the upper members 31, 32 previously fixed to the rear wheel house 24 and the upper end portions of the lower members 33, 34 previously fixed to the rear side frame 10 are joined together by adhesive or welding in a vehicle assembling process. Thereby, the above-described projection portions 27, 28 at the damper support portion 25, the above-described projection portions of the body portions 37 of the upper members 31, 32, and projection portions of the body portions 39, 42 of the lower members 33, 34 form reinforcing portions which continuously extend substantially vertically.

Figure 10:
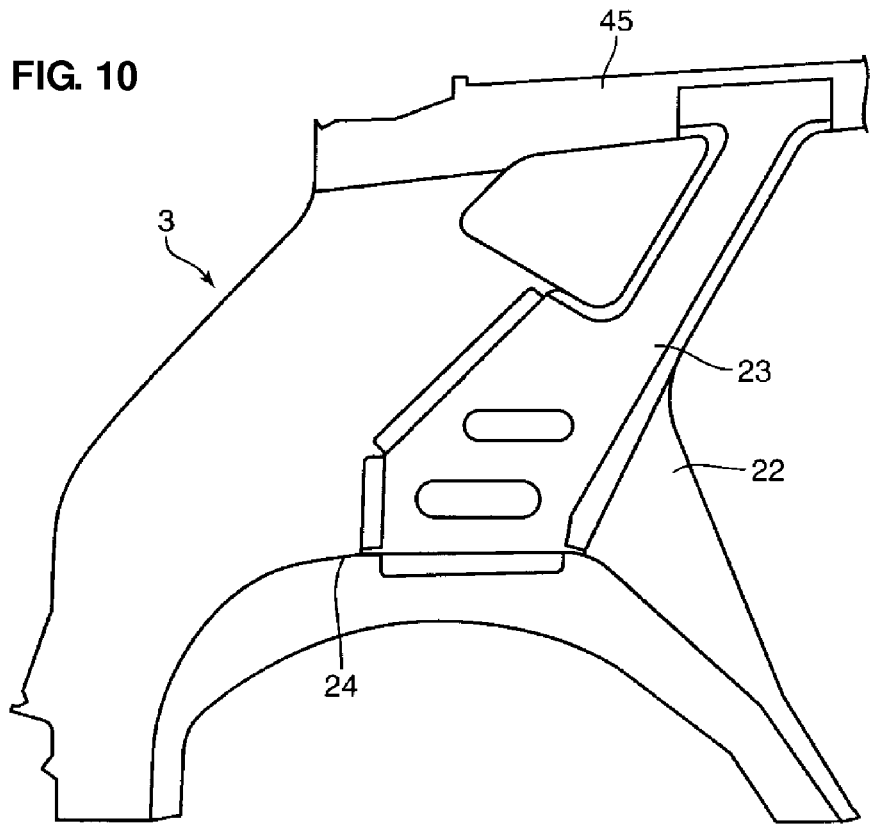
FIG. 10 is a side view showing a specific structure of an outer-face-side reinforcing member.

Further, as shown in FIGS. 3 and 10, the outer-face-side reinforcing member 23 arranged between the outer and inner panels 21, 22 of the vehicle-body side wall portion 3 is provided to extend upwardly from a specified position corresponding to the upper portion of the rear wheel house 24 on the outward side of the damper support portion 25. An upper end portion of the outer-face-side reinforcing member 23 connects to the roof rail 45 provided at the vehicle-body upper portion.

As shown in FIG. 9 and others, the first cross member 46 which interconnects the pair of rear side frames 10 is provided to extend in the vehicle width direction along the kick-up portion 7 near at the connection position of the rear side frame 10 connecting to the first brace member 29. The first cross member 46 comprises the upper member 48 which is arranged on the upper-face side of the kick-up portion 7 and made of the member having the U-shaped cross section with a pair of flanges and the lower member 49 which is arranged on the lower-face side of the kick-up portion 7 and made of the member having the U-shaped cross section with a pair of flanges.

The upper member 48 of the first cross member 46 is fixed to the vehicle-inside wall face of the upper member 16 of the rear side frame 10 in a state in which a substantially whole part of the upper member 48 overlaps with the lower end portion of the first brace member 29 in the longitudinal direction in the side view. The lower end portion of the first brace member 29 is welded by spot welding to the upper face and the front face of the upper member 48. The lower member 49 of the first cross member 46 is fixed to the inward wall portion of the lower member 17 of the rear side frame 10 in a state in which a substantially whole part of the lower member 49 overlaps with the upper member 48 in the longitudinal direction in the side view. Further, the side portion of the sub frame 15 is fixed to a rear wall face of the lower member 49 by bolts or the like.

The second cross member 47 which interconnects the pair of rear side frames 10 is provided to extend in the vehicle width direction along the kick-up portion 7 near at the connection position of the rear side frame 10 connecting to the second brace member 30. The second cross member 47 is made of a member having a U-shaped cross section with a pair of flanges which is fixed to a lower face of the rear floor portion 8, and it is fixed to the vehicle-inside wall face of the lower member 17 of the rear side frame 10 in a state in which a front side portion of the second cross member 30 overlaps with a rear side portion of the lower end of the second brace member 30 in the longitudinal direction.

As described above, in the rear vehicle-body structure of a vehicle in which the damper support portion 25 supporting the upper end portion of the suspension damper 12 is provided at the rear wheel house 24, on the vehicle-inside wall face of the rear wheel house 24 are provided the first brace member 29 which interconnects the front portion of the damper support portion 25 and the rear side frame 10 and the second brace member 30 which interconnects the rear portion of the damper support portion 25 and the rear side frame 10. Accordingly, the rigidity of the damper support portion 25 provided at the rear wheel house 24 can be improved easily and effectively with a simple structure, and this structure has superiority in its applicability.

That is, the damper support portion 25 can be effectively reinforced and thereby its falling down inwardly can be effectively prevented by providing the above-described pair of brace members 29, 30. Accordingly, unlike the prior art which may be limited to some particular kinds of vehicle, for example, in case the rigidity of the rear vehicle body is secured by the upper cross member supporting the front end portion of the rear package tray, this structure may be limited to the sedan type of vehicle, or in case the connecting gusset connecting the peripheral portion of the opening at the rear wall and upper portion of the rear wheel house portion is provided to extend in the vehicle longitudinal direction, this structure may be limited to the hatch back type of vehicle, the above-described structure according to the present embodiment is superior in its applicability.

Further, in case the first and second brace members 29, 30 are arranged to extend substantially vertically along the vehicle-inside wall face of the rear wheel house 24, the damper support portion 25 can be effectively reinforced, without improperly deteriorating the utility of the rear baggage room. Moreover, vibrations occurring at the rear wheel house 24 which may be caused by the load inputted from the rear suspension 14 or the sub frame 15 during the vehicle traveling can be absorbed by the first and second brace members 29, 30, so that improper noise can be effectively restrained from occurring.

According to the embodiment described above, since the first cross member 46 interconnecting the rear side frames 10, 10 is provided at the connection position of the side frame 10 connecting to the first brace member 29 provided near the kick-up portion 7 of the floor panel 1, the first cross member 46 can be effectively used as a support member against the load inputted to the damper supporter portion 25 from the suspension damper 12. Thereby, the damper support portion 25 can be further effectively reinforced with a simple structure, and thereby the damper support portion 25's falling down inwardly can be securely prevented.

Further, in case the second cross member 47 interconnecting the rear side frames 10, 10 is provided at the connection position of the side frame 10 connecting to the second brace member 30 provided in back of the first brace member 29 as described above, the load inputted to the damper support portion 25 from the suspension damper 12 can be transmitted from the second brace member 30 to the second cross member 47 and the rear baggage room, and thereby supported effectively. Accordingly, the damper support portion 25's falling down inwardly and the like can be further effectively prevented.

In particular, according to the embodiment described above, since the second cross member 47 provided along the floor panel 1 is arranged so that at least part of this member 47 overlaps, in the vehicle longitudinal direction, with the second brace member 30 in the side view, the load inputted to the damper support portion 25 from the suspension damper 12 of the rear suspension 14 can be securely transmitted from the second brace member 30 to the second cross member 47 and the floor panel 1.

Herein, the second brace member 30 may overlap with the whole part of the second cross member 47 in the vehicle longitudinal direction in the side view, or the front side portion of the second brace member 30 may overlap with the rear side portion of the second cross member 47. However, in case the rear side portion of the second brace member 30 overlaps with the front side portion of the second cross member 47 in the present embodiment, the sufficient amount of arrangement distance between the first cross member 46 and the second cross member 47 can be secured. Thereby, the rear vehicle body can be effectively reinforced by the cross members 46, 47, and the load inputted to the damper support portion 25 from the rear suspension 14 can be securely transmitted from the second brace member 30 to the second cross member 47. Further, in this case, since the degree of longitudinal slant arrangement of the second brace member 30 can be gentle, the damper support portion 25's falling down inwardly can be effectively prevented.

Moreover, in case the first and second brace members 29, 30 are made of the member having the U-shaped cross section with the open end outwardly, respectively, and the first and second brace members 29, 30 are attached to the vehicle-inside wall face of the rear wheel house 24 so that the closed cross section extending substantially vertically is formed between the first and second brace members 29, 30 and the rear wheel house 24, respectively, as described in the present embodiment, the modulus of section at the portions where the first and second brace members 29, 30 are attached can be properly increased without setting the plate thickness of these brace members 29, 30 to be great. Accordingly, the rigidity and strength of the rear wheel house 24 can be effectively improved, with restraining increase of the vehicle-body weight, so that the damper support portion 25's falling down inwardly and the like can be effectively prevented.

Figure 11:
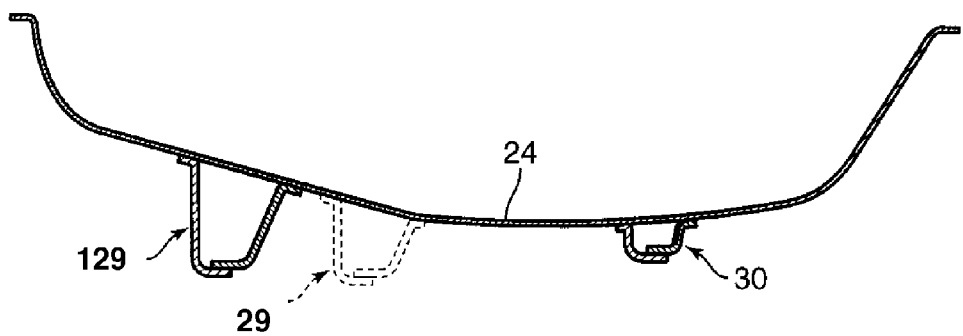
FIG. 11 is a plan sectional view showing a modified embodiment of the rear vehicle-body structure of a vehicle according to the present invention.

A front part of vehicle-inside wall face of the rear wheel house 24, where the first brace member 29 is fixed, is configured to have a slant face in such a manner that its front end is located outwardly, in the vehicle width direction, as shown in FIG. 11. Accordingly, in case a modified first brace member 129 which is illustrated by a solid line in FIG. 11 is located at a forward position, compared with the above-described first brace member 29 which is illustrated by a broken line in FIG. 11, the second moment of area of the first brace member 129 can be made greater effectively.

Figure 12:
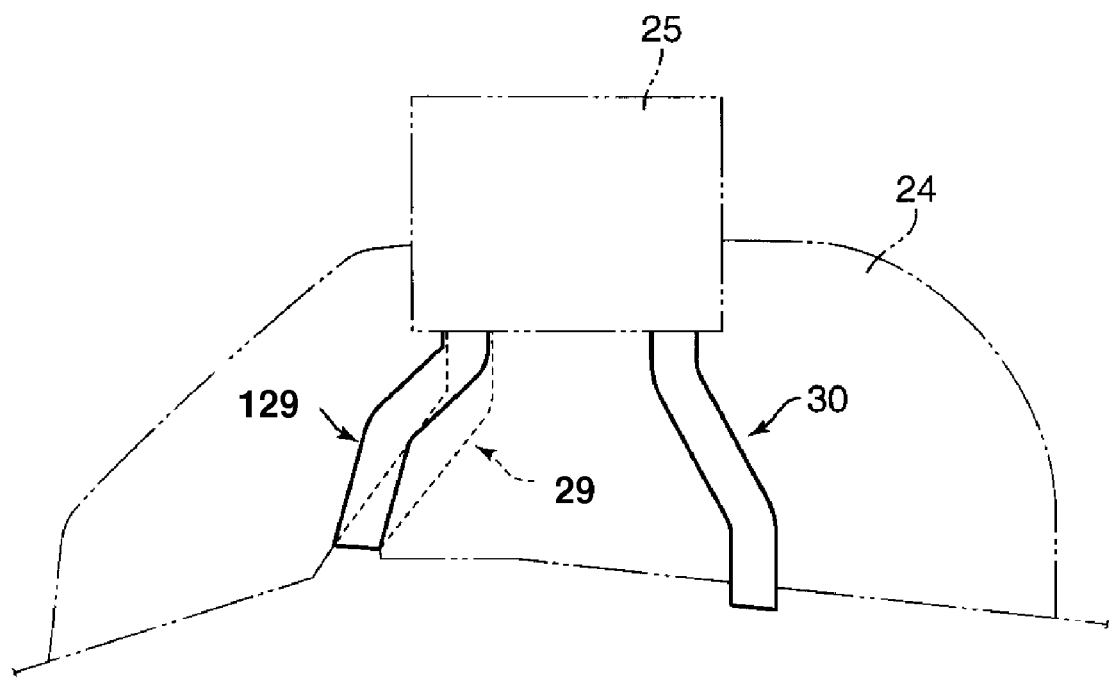
FIG. 12 is a side view showing a specific structure of the modified embodiment of the rear vehicle-body structure of a vehicle.

For example, in case the first brace member 129 is configured so that its middle part is located forwardly as illustrated by a sold line in FIG. 12, its second moment of area can be effectively increased, securing the amount of its arrangement height, without making the first brace member 129 project greatly toward the vehicle inside. Thereby, the large storage space of the rear baggage room can be secured, and also the reinforcement function with the first brace member 129 can be achieved properly, so that the damper support portion 25's falling down inwardly can be effectively prevented.

Moreover, in case, as shown in the above-described embodiment, the pair of projection portions 27, 28 which projects toward the vehicle inside is formed at the damper support portion 25 of the rear wheel house 24, and the first and second brace members 29, 30 connect to the pair of projection portions 27, 28 at upper portions thereof, respectively, both of the front side portion and the rear side portion of the damper support portion 25 can be effectively reinforced, without increasing the vehicle-body weight. Further, the load inputted to the damper support portion 25 from the suspension damper 12 can be efficiently transmitted to the vehicle-body side wall portion 3 and the rear side frame 10 via the first and second brace members 29, 30 and thereby supported properly. Further, the support of load dispersion by the vehicle-body side wall portion 3 can be efficiently achieved by the above-described efficient load transmission of the damper support portion 25 to the vehicle-body side wall portion 3.

Since the reinforcing member 26 which reinforces the damper support portion 25 is provided, and the first and second brace members 29, 30 connect to the reinforcing member 26 at upper portions thereof, respectively, the upper portions of the first and second brace members 29, 30 can be firmly interconnected by the damper support portion 25 and the reinforcing member 26. Thereby, the suspension damper 12 can be stably supported at the damper support portion 25, and the load inputted to the damper support portion 25 and the reinforcing member 26 from the suspension damper 12 can be effectively transmitted to the first and second brace members 29, 30 and thereby supported properly.

Moreover, in case the outer-face-side reinforcing member 23 is provided on the outer-face side, in the vehicle width direction, of the damper support portion 25 so as to extend upwardly from the specified position corresponding to the upper portion of the rear wheel house 24 as described in the present embodiment, the load inputted to the damper support portion 25 from the suspension damper 12 can be transmitted from the outer-face-side reinforcing member 23 to the roof rail 45, and thereby supported further effectively.

The present invention should not be limited to the above-described embodiments, and any other modifications and improvements may be applied within the scope of a sprit of the present invention.

What is claimed is:

1. A rear vehicle-body structure of a vehicle, comprising:
   a wheel house projecting toward a vehicle inside;
   a suspension damper stored on a vehicle outside of the wheel house;
   a damper support portion provided at an upper portion of the wheel house and supporting an upper end portion of the suspension damper;
   a side frame extending in a vehicle longitudinal direction at a side portion of a vehicle floor;
   a cross member extending in a vehicle width direction along the vehicle floor and connecting to the side frame;
   a first brace member provided on a vehicle-inside wall face of the wheel house and interconnecting a front portion, in the vehicle longitudinal direction, of the damper support portion and the side frame; and
   a second brace member provided on the vehicle-inside wall face of the wheel house and interconnecting a rear portion, in the vehicle longitudinal direction, of the damper support portion and the side frame.

2. The rear vehicle-body structure of a vehicle of claim 1, wherein said side frame comprises a side frame provided at both side portions of the vehicle floor, and said cross member includes a cross member which interconnects said side frames at a connection position of the side frame connecting to said first brace member.

3. The rear vehicle-body structure of a vehicle of claim 1, wherein said side frame comprises a side frame provided at both side portions of the vehicle floor, and said cross member includes a cross member which interconnects said side frames at a connection position of the side frame connecting to said second brace member.

4. The rear vehicle-body structure of a vehicle of claim 1, wherein said side frame comprises a side frame provided at both side portions of the vehicle floor, and said cross member includes a first cross member which interconnects said side frames at a connection position of the side frame connecting to said first brace member and a second cross member which interconnects said side frames at a connection position of the side frame connecting to said second brace member.

5. The rear vehicle-body structure of a vehicle of claim 4, wherein said second cross member is arranged so that at least part of the second cross member overlaps, in the vehicle longitudinal direction, with said second brace member in a vehicle side view.

6. The rear vehicle-body structure of a vehicle of claim 1, wherein said first and second brace members comprise a member having a U-shaped cross section with an open end, respectively, and the first and second brace members are attached to the vehicle-inside wall face of the wheel house so that a closed cross section extending substantially vertically is formed between the first and second brace members and the wheel house, respectively.

7. The rear vehicle-body structure of a vehicle of claim 6, wherein a pair of projection portions which projects toward the vehicle inside is formed at said damper support portion of the wheel house at specified positions which are located in front and back of said suspension damper, respectively, and said first and second brace members connect to said pair of projection portions at upper portions thereof, respectively.

8. The rear vehicle-body structure of a vehicle of claim 1, wherein said damper support portion of the wheel house includes a reinforcing member which reinforces the damper support portion, and said first and second brace members connect to said reinforcing member at upper portions thereof, respectively.

9. The rear vehicle-body structure of a vehicle of claim 1, wherein an outer-face-side reinforcing member is provided on an outer-face side, in the vehicle width direction, of said damper support portion of the wheel house so as to extend upwardly from a specified position corresponding to the upper portion of the wheel house.

10. A rear vehicle-body structure of a vehicle, comprising:
a wheel house projecting toward a vehicle inside;
a suspension damper stored on a vehicle outside of the wheel house;
a damper support portion provided at an upper portion of the wheel house and supporting an upper end portion of the suspension damper;
a pair of side frames extending in a vehicle longitudinal direction at both side portions of a vehicle floor;
first and second cross members extending in a vehicle width direction along the vehicle floor and interconnecting the pair of side frames, respectively;
a first brace member provided on a vehicle-inside wall face of the wheel house and interconnecting a front portion, in the vehicle longitudinal direction, of the damper support portion and the side frame; and
a second brace member provided on the vehicle-inside wall face of the wheel house and interconnecting a rear portion, in the vehicle longitudinal direction, of the damper support portion and the side frame,
wherein said first cross member interconnects the pair of side frames at a connection position of the side frame connecting to said first brace member, and said second cross member interconnects the pair of side frames at a connection position of the side frame connecting to said second brace member,
said first and second brace members comprise a member having a U-shaped cross section with an open end, respectively, and the first and second brace members are attached to the vehicle-inside wall face of the wheel house so that a closed cross section extending substantially vertically is formed between the first and second brace members and the wheel house, respectively, and
a pair of projection portions which projects toward the vehicle inside is formed at said damper support portion of the wheel house at specified positions which are located in front and back of said suspension damper, respectively, and said first and second brace members connect to said pair of projection portions at upper portions thereof, respectively.

11. The rear vehicle-body structure of a vehicle of claim 10, wherein said damper support portion of the wheel house includes a reinforcing member which reinforces the damper support portion, and said first and second brace members connect to said reinforcing member at upper portions thereof, respectively.

12. The rear vehicle-body structure of a vehicle of claim 10, wherein an outer-face-side reinforcing member is provided on an outer-face side, in the vehicle width direction, of said damper support portion of the wheel house so as to extend upwardly from a specified position corresponding to the upper portion of the wheel house.

* * * * *